US012758027B2

(12) United States Patent
Yamamuro

(10) Patent No.: US 12,758,027 B2

(45) Date of Patent: Oct. 13, 2026

(54) SEAT SKIN MATERIAL AND SEAT INCLUDING SAME

(71) Applicant: Asahi Kasei Kabushiki Kaisha, Tokyo (JP)

(72) Inventor: Misako Yamamuro, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 155 days.

(21) Appl. No.: 18/280,769

(22) PCT Filed: Mar. 22, 2022

(86) PCT No.: PCT/JP2022/013165

§ 371 (c)(1),
(2) Date: Sep. 7, 2023

(87) PCT Pub. No.: WO2022/202811

PCT Pub. Date: Sep. 9, 2022

(65) Prior Publication Data

US 2024/0148155 A1 May 9, 2024

(30) Foreign Application Priority Data

Mar. 24, 2021 (JP) ................................ 2021-049801

(51) Int. Cl.

| | |
|---|---|
| ***A47C 27/00*** | (2006.01) |
| ***B60N 2/58*** | (2006.01) |
| ***D04B 21/16*** | (2006.01) |
| ***D04B 21/20*** | (2006.01) |

(52) U.S. Cl.

CPC .......... *A47C 27/002* (2013.01); *D04B 21/165* (2013.01); *D04B 21/20* (2013.01); *B60N 2/5891* (2013.01); *D10B 2331/04* (2013.01); *D10B 2401/04* (2013.01); *D10B 2403/0332* (2013.01); *D10B 2505/08* (2013.01)

(58) Field of Classification Search

CPC .... A47C 27/002; D04B 21/165; D04B 21/20; B60N 2/5891; D10B 2331/04; D10B 2401/04; D10B 2403/0332; D10B 2505/08

See application file for complete search history.

(56) References Cited

U.S. PATENT DOCUMENTS

| | | | | |
|---|---|---|---|---|
| 6,068,332 | A * | 5/2000 | Faust | B60N 2/5635 5/652.2 |
| 2003/0033838 | A1 | 2/2003 | Ikenaga et al. | |
| 2018/0274140 | A1 | 9/2018 | Jang et al. | |
| 2018/0370403 | A1* | 12/2018 | Townley | B60N 2/7017 |
| 2019/0352811 | A1* | 11/2019 | Tseng | D04B 1/16 |
| 2020/0077539 | A1* | 3/2020 | Mueller | D04B 21/20 |
| 2020/0094514 | A1* | 3/2020 | Harage | D02G 3/28 |
| 2020/0190713 | A1* | 6/2020 | Taniguchi | D04B 21/06 |
| 2020/0240055 | A1* | 7/2020 | Mueller | D04B 21/20 |
| 2021/0120965 | A1* | 4/2021 | Abdulbaki | A47G 9/10 |
| 2022/0081810 | A1 | 3/2022 | Kashima | |
| 2022/0307170 | A1* | 9/2022 | Burke | B32B 5/26 |
| 2024/0148155 | A1* | 5/2024 | Yamamuro | D04B 21/16 |
| 2024/0307219 | A1* | 9/2024 | Burris | A61G 7/057 |

FOREIGN PATENT DOCUMENTS

| | | | |
|---|---|---|---|
| CA | 2497911 | A | 3/2004 |
| CN | 1326520 | A | 12/2001 |
| EP | 1167603 | A1 | 1/2002 |
| JP | 2001-081652 | A | 3/2001 |
| JP | 2004-183118 | A | 7/2004 |
| JP | 2004-190191 | A | 7/2004 |
| JP | 2004-229894 | A | 8/2004 |
| JP | 2006-291416 | A | 10/2006 |
| JP | 2007-044386 | A | 2/2007 |
| JP | 2007-195777 | A | 8/2007 |
| JP | 2008-261077 | A | 10/2008 |
| JP | 2011-244867 | A | 12/2011 |
| JP | 2014-088632 | A | 5/2014 |
| JP | 2015-010282 | A | 1/2015 |
| JP | 2015-151645 | A | 8/2015 |
| KR | 2003-0092033 | A | 12/2003 |
| KR | 10-2016-0063802 | A | 6/2016 |
| KR | 10-2017-0044775 | A | 4/2017 |
| KR | 10-1938838 | B1 | 1/2019 |
| WO | 2018/073710 | A1 | 4/2018 |
| WO | 2020/158898 | A1 | 8/2020 |

OTHER PUBLICATIONS

Supplementary European Search Report issued in European Patent Application No. 22775594.9 dated Sep. 10, 2024.

International Search Report issued in corresponding International Patent Application No. PCT/JP2022/013165 dated Jun. 14, 2022.

International Preliminary Report on Patentability and Written Opinion issued in corresponding International Patent Application No. PCT/JP2022/013165 dated Oct. 5, 2023.

* cited by examiner

*Primary Examiner* — David R Dunn

(74) *Attorney, Agent, or Firm* — Morgan, Lewis & Bockius LLP

(57) ABSTRACT

Provided are: a seat skin material which is composed of a solid knit fabric that achieves both seating comfort and heating comfort and that further exhibits excellent abrasion resistance; and a seat comprising said seat skin material. A seat skin material according to the present disclosure is composed of a solid knit fabric that comprises: a front-layer knitted fabric; a back-layer knitted fabric; and a connecting strand that connects the front-layer knitted fabric and the back-layer knitted fabric.

13 Claims, No Drawings

SEAT SKIN MATERIAL AND SEAT INCLUDING SAME

FIELD

The present invention relates to a seat skin material and to a seat comprising it.

BACKGROUND

Urethane foam has been a conventionally used material for chair and seat cushions. However, urethane foam has been associated with a number of problems including management difficulties due to the chemicals used in its production, poisonous gas generation during waste processing, and recycling difficulty. Foamed urethane cushion materials also have poor air permeability and heat dissipation, which tend to produce a feeling of stuffiness or sweaty stickiness when the materials are used for sitting, making it impossible to obtain a comfortable sitting experience. Three-dimensional knitted fabrics using cushion material substitutes for urethane foams have therefore come into use in recent years.

Three-dimensional knitted fabrics composed of knitted fabrics with two layers (front and back) and connecting threads connecting the two-layer knitted fabrics, are used for various purposes including cushion materials, because of their excellent air permeability and compression elastic recovery. PTL 1 proposes a cushion material that includes a three-dimensional knitted fabric with a specified skin contact surface MMD value, and having a cushioning property, body pressure dispersion and a comfortable feel while sitting, with low skin irritation even after prolonged skin contact. PTL 2 proposes a three-dimensional knitted fabric that provides a refreshing feel by increasing heat dissipation by the use of high heat-conductive fibers.

CITATION LIST

Patent Literature

[PTL 1] Japanese Unexamined Patent Publication No. 2007-44386

[PTL 2] Japanese Unexamined Patent Publication No. 2004-190191

SUMMARY

Technical Problem

However, the cushion material described in PTL 1 is not concerned with thermal comfort including air permeability and heat dissipation. The three-dimensional knitted fabric of PTL 2 has a mesh structure, with point contact being made between the seat skin material and the human body when a human sits, but its sitting comfort has been insufficient for some purposes, and because of the low stitch density, the load of abrasion is concentrated at the stitched sections which results in napping after prolonged use, tending to significantly alter the outer appearance.

In light of the current level of technology, the problem to be solved by the invention is to provide a three-dimensional knitted fabric having both sitting comfort and thermal comfort, as well as excellent wear resistance.

Solution to Problem

The present inventors have conducted much ardent research with the aim of solving the aforementioned problem, and as a result the invention has been completed upon finding, unexpectedly, that the problem can be solved if a seat skin material including a three-dimensional knitted fabric has specified ranges for the thermal conductance, air permeability and heat dissipation, as well as contact cooling on the seating surface.

Specifically, the present invention provides the following.

[1] A seat skin material that includes a three-dimensional knitted fabric constructed of a front layer knitted fabric, a back layer knitted fabric, and connecting thread connecting the front layer knitted fabric and back layer knitted fabric, wherein the outer surface of the front layer knitted fabric is the seating surface, the thermal conductance value of the seat skin material is 8.0 $W/m^2 \cdot °$ C. or greater, the air permeability from the back layer knitted fabric toward the front layer knitted fabric of the three-dimensional knitted fabric is 50 $cc/cm^2/sec$ or greater, the heat dissipation value is 5.0 $W/m^2 \cdot °$ C. or greater, and the level of contact cooling on the seating surface is 75 $W/m^2 \cdot °$ C. or greater.

[2] The seat skin material according to [1] above, wherein the thermal conductance value of the seat skin material is 40.0 $W/m^2 \cdot °$ C. or lower.

[3] The seat skin material according to [1] or [2] above, wherein the air permeability from the back layer knitted fabric toward the front layer knitted fabric of the three-dimensional knitted fabric is 400 $cc/cm^2/sec$ or lower.

[4] The seat skin material according to any one of [1] to [3] above, wherein the heat dissipation value is 15.0 $W/m^2 \cdot °$ C. or lower.

[5] The seat skin material according to any one of [1] to [4] above, wherein the level of contact cooling on the seating surface is 200 $W/m^2 \cdot °$ C. or lower.

[6] The seat skin material according to any one of [1] to [5] above, wherein the level of contact cooling on the side opposite from the seating surface is 75 $W/m^2 \cdot °$ C. to 200 $W/m^2 \cdot °$ C.

[7] The skin material according to any one of [1] to [6] above, wherein the air permeability from the connecting layer side between the front layer knitted fabric and back layer knitted fabric toward the front layer knitted fabric of the three-dimensional knitted fabric is 35 $cc/cm^2/sec$ or greater.

[8] The skin material according to [7] above, wherein the air permeability from the connecting layer side between the front layer knitted fabric and back layer knitted fabric toward the front layer knitted fabric of the three-dimensional knitted fabric is 40 $cc/cm^2/sec$ or greater.

[9] The skin material according to [8] above, wherein the air permeability from the connecting layer side between the front layer knitted fabric and back layer knitted fabric toward the front layer knitted fabric of the three-dimensional knitted fabric is 50 $cc/cm^2/sec$ or greater.

[10] The skin material according to any one of [1] to [9] above, wherein the air permeability from the connecting layer side between the front layer knitted fabric and back layer knitted fabric toward the front layer knitted fabric of the three-dimensional knitted fabric is 400 $cc/cm^2/sec$ or lower.

[11] The seat skin material according to any one of [1] to above, wherein the front layer knitted fabric includes multifilaments, and the stitch density of the front layer knitted fabric is 11,000 to 21,000.

[12] The seat skin material according to any one of [1] to above, wherein the thickness is 3 to 15 mm.

[13] The seat skin material according to any one of [1] to above, wherein the thermal conductance value of the seat skin material is 40.0 $W/m^2 \cdot °$ C. or lower, the air permeability from the back layer knitted fabric toward the front layer knitted fabric of the three-dimensional knitted fabric is 400 cc/cm$^2$/sec or lower, the heat dissipation value is 15.0 W/m$^2$·° C. or lower, the level of contact cooling on the seating surface is 200 W/m$^2$·° C. or lower, and the air permeability from the connecting layer side between the front layer knitted fabric and back layer knitted fabric toward the front layer knitted fabric of the three-dimensional knitted fabric is 50 cc/cm$^2$/sec to 400 cc/cm$^2$/sec.

[14] A seat that includes a seat skin material according to any one of [1] to above.

Advantageous Effects of Invention

If the seat skin material of the invention is used as the seating surface of a seat it is possible to obtain both sitting comfort and thermal comfort and a comfortable sitting feel, while also having excellent wear resistance and low change in outer appearance with prolonged use.

DESCRIPTION OF EMBODIMENTS

An embodiment of the invention will now be described in detail.

One embodiment of the invention is a seat skin material that includes a three-dimensional knitted fabric constructed of a front layer knitted fabric, a back layer knitted fabric, and connecting thread connecting the front layer knitted fabric and back layer knitted fabric, wherein the outer surface of the front layer knitted fabric is the seating surface, the thermal conductance value of the seat skin material is 8.0 W/m$^2$·° C. or greater, the air permeability from the back layer knitted fabric toward the front layer knitted fabric of the three-dimensional knitted fabric is 50 cc/cm$^2$/sec or greater, the heat dissipation value is 5.0 W/m$^2$·° C. or greater, and the level of contact cooling on the seating surface is 75 W/m$^2$·° C. or greater.

The seat skin material of the embodiment is a seat skin material that includes a three-dimensional knitted fabric constructed of a front layer knitted fabric, a back layer knitted fabric, and connecting thread connecting the front layer knitted fabric and back layer knitted fabric, and having the outer surface of the front layer knitted fabric as the seating surface. The three-dimensional knitted fabric is knitted using a warp knitting machine, circular knitting machine or flat knitting machine having two opposite rows of needle beds, the knitting machine gauge preferably being 9 to 28 gauge.

The seat skin material of the embodiment has a thermal conductance value of 8.0 W/m$^2$·° C. or greater, preferably 9.0 W/m$^2$·° C. or greater and more preferably 9.5 W/m$^2$·° C. or greater. The thermal conductance value is measured using a THERMO LABO II Tester by Kato Tech Corp. The specific measuring method is described below. A thermal conductance of less than 8.0 W/m$^2$·° C. is not preferred because heat from the human body will fail to escape while sitting, resulting in reduced comfort. For a thermal conductance of 8.0 W/m$^2$·° C. or greater, it is preferred to compact the front layer knitted fabric to reduce the air layer and avoid excessively increasing the thickness, thereby produce a structure with higher thermal conductivity and helping to support the air permeability by the three-dimensional structure. The thermal conductance value of the seat skin material of the embodiment is preferably 40.0 W/m$^2$·° C. or lower.

The seat skin material of the embodiment has an air permeability of 50 cc/cm$^2$/sec or greater, preferably 60 cc/cm$^2$/sec or greater and more preferably 70 cc/cm$^2$/sec or greater, from the back layer knitted fabric through the front layer knitted fabric of the three-dimensional knitted fabric. The air permeability is measured using a Frazier tester, according to the air permeability test method of JIS-L-1096, 1018 (Air Volume Method A). A specific method for measuring the air permeability is described below. An air permeability of lower than 50 cc/cm$^2$/sec is also not preferred as this may produce a feeling of stuffiness while increasing temperature and humidity between the sheet and the human body while sitting, thus reducing the level of comfort. An air permeability of 50 cc/cm$^2$/sec or greater is a suitable level as a covering material for a seat sheet to be used in combination with a cushion member incorporated into a ventilation system. The air permeability of the seat skin material of the embodiment is preferably 400 cc/cm$^2$/sec or lower.

The seat skin material of the embodiment has an air permeability of preferably 35 cc/cm$^2$/sec or greater, more preferably 40 cc/cm$^2$/sec or greater and even more preferably 50 cc/cm$^2$/sec or greater, from the side of the connecting layer between the front layer knitted fabric and the back layer knitted fabric of the three-dimensional knitted fabric (hereunder also referred to simply as "connecting layer") toward the front layer knitted fabric. The air permeability is the permeability for air during measurement of the air permeability of the three-dimensional knitted fabric under the suction conditions of the air permeability test method of JIS L1096 1018 (Method A), with a 15 cm-square three-dimensional knitted fabric test piece size, placing it at the opening of the air permeability tester with the front layer knitted fabric facing downward, and overlaying a 3 mm-thick, 20 cm-square silicon rubber plate onto the outer surface of the back layer knitted fabric to shield air passing through the back layer knitted fabric, while allowing the air to enter the four sided cross-section of the three-dimensional knitted fabric and pass through the connecting layer to permeate the front layer knitted fabric. The air permeability of the seat skin material of the embodiment is preferably 400 cc/cm$^2$/sec or lower.

The seat skin material of the embodiment has a heat dissipation value of 5.0 W/m$^2$·° C. or greater, preferably 5.2 W/m$^2$·° C. or greater and more preferably 5.5 W/m$^2$·° C. or greater. The heat dissipation value is measured using a THERMO LABO II Tester by Kato Tech Corp. The specific measuring method is described below. A heat dissipation value of less than 5.0 W/m$^2$·° C. is not preferred because heat will be trapped between the human body and the sheet while sitting, resulting in reduced comfort. For a heat dissipation value of 5.0 W/m$^2$·° C. or greater, similar to the thermal conductance, it is preferred to compact the front layer knitted fabric to reduce the air layer, thereby producing a structure with higher thermal conductivity and helping to support the air permeability by the three-dimensional structure. The heat dissipation value of the seat skin material of the embodiment is preferably 15.0 W/m$^2$·° C. or lower.

The seat skin material of the embodiment has a level of contact cooling on the seating surface of 75 W/m$^2$·° C. or greater, preferably 80 W/m$^2$·° C. or greater and more preferably 90 W/m$^2$·° C. The contact cooling is measured using a THERMO LABO II by Kato Tech Corp. The specific measuring method is described below. A high level of contact cooling corresponds to high contact area between the hot plate and the seating surface of the sample, meaning that no feeling of itchiness or discomfort is experienced while a human is sitting, and the seating surface also has a dense structure. A dense seating surface can reduce concentration of friction load at the stitches and inhibit napping during prolonged use. If the level of contact cooling of the side opposite from the seating surface (the outer surface of the knitted fabric on the back side) is 75 $W/m^2 \cdot ^\circ$ C. or greater, a more preferred situation will result as heat transmitted from the seating surface to the side opposite from the seating surface while a human is sitting will be transmitted to the chair frame, or to urethane in the case of a vehicle seat, which are to contact with the side opposite from the seating surface, thereby allowing heat to escape more easily and improving the refreshing feel. The level of contact cooling on the seating surface of the seat skin material of the embodiment is preferably 200 $W/m^2 \cdot ^\circ$ C. or lower.

When the front layer knitted fabric in the seat skin material of the embodiment is composed of multifilament yarn, the stitch density M, indicating the tightness per stitch and represented by the following formula:

$$M=N\times\sqrt{D}$$

{where N is the number of stitches in the front layer knitted fabric per 2.54 cm-square (6.45 $cm^2$), and D is the total fineness (decitex) of the multifilament yarn forming one stitch of the front layer knitted fabric}, is preferably 11,000 to 21,000 and more preferably 12,000 to 19,000. A specific method for measuring the stitch density is described below. A stitch density of 11,000 or greater will reduce movement due to external force such as single yarn friction in the multifilament yarn forming the stitches, thus helping to reduce napping. A stitch density of 21,000 or lower will produce a more soft hand quality and satisfactory knitting properties while also helping to adequately ensure air permeability. The phrase "total fineness of the multifilament yarn forming one stitch of the front layer knitted fabric" means the total fineness of only the multifilament yarn that forms the stitching, excluding fibers that do not form stitching, such as inlay stitching.

Either monofilament yarn or multifilament yarn may be used as the connecting thread of the three-dimensional knitted fabric forming the seat skin material of the embodiment, but preferably monofilament yarn is used from the viewpoint of obtaining a compression modulus in a suitable range for the seat skin material and exhibiting satisfactory compression recoverability. The fiber material used for the connecting thread may be fibers of any desired material, such as polytrimethylene terephthalate fibers, polybutylene terephthalate fibers, polyethylene terephthalate fibers, polyamide fibers, polypropylene fibers, polyvinyl chloride fibers or polyester-based elastomer fibers. Using polyethylene terephthalate fibers is preferred for improved recycling properties of the seat skin material. The cross-sectional shapes of the fibers may be circular, or polygonal-shaped such as triangular, L-shaped, T-shaped, Y-shaped, W-shaped, leaf-shaped, flat or dogbone-shaped, multilobal, hollow, or amorphous, but circular cross-sections are preferred for improved durability of the cushioning property of the seat skin material. In order to prevent unpleasant sounds being generated by rubbing between the connecting threads when the seat skin material is compressed, monofilament yarn and multifilament yarn are preferably used together in the connecting threads by mixed knitting or thread compositing, to take advantage of the multifilament yarn as a cushioning material.

When monofilament yarn is used as the connecting thread, yarn of any size may be used, but a size of 50 to 600 decitex is preferred, with 80 to 500 decitex being more preferred, in order to obtain a soft elastic feel. The connecting thread may form looped stitches in the front layer knitted fabric and/or back layer knitted fabric, or it may have a structure that is inserted or tucked into the front layer knitted fabric and/or back layer knitted fabric, but for improved shape stability of the three-dimensional knitted fabric, preferably at least two connecting threads connect the front layer knitted fabric and back layer knitted fabric together in a cross (X-shaped) or truss fashion, being inclined diagonally in opposite directions. The connecting threads may also be configured with two connecting threads in both a cross and truss fashion, optionally either with one single connecting thread repeated on the front or back, appearing as two threads.

The fibers used in the front layer knitted fabric and back layer knitted fabric of the three-dimensional knitted fabric forming the seat skin material of the embodiment may be fibers of any type such as synthetic fibers including polyester-based fibers such as polyethylene terephthalate fibers, polytrimethylene terephthalate fibers or polybutylene terephthalate fibers, or polyamide-based fibers, polyacrylic fibers or polypropylene-based fibers, or natural fibers such as cotton, hemp or wool, or regenerated fibers such as cupra rayon, viscose rayon or lyocell. The cross-sectional shapes of the fibers may be circular, polygonal such as triangular, L-shaped, T-shaped, Y-shaped, W-shaped, leaf-shaped, flat or dogbone-shaped, multilobal, hollow, or amorphous. The fibers may be in the form of raw yarn, or bulking-treated yarn such as spun yarn, twisted yarn, false twisted yarn, air-entangled yarn or fluid injected yarn. When the connecting thread is monofilament yarn, it is preferred to use bulky yarn such as false twisted yarn or spun yarn of multifilament yarn in order to increase the coverage factor so that the connecting thread is not exposed on the knitted fabric surface. The size of the multifilament yarn in this case will usually be 150 or 1000 decitex, with the number of filaments set as desired. When the fibers used in the knitted fabrics on the surface layer and back layer are multifilaments, the monofilament size is preferably 0.5 to 6.0 decitex, or more preferably 1.0 to 5.0 decitex for even higher monofilament strength.

The front layer knitted fabric, back layer knitted fabric and/or connecting thread of the three-dimensional knitted fabric composing the seat skin material of the embodiment are preferably colored. The coloring method may be a method of yarn dyeing uncolored thread as a skein or cheese (pre-dyeing), a method of dyeing by mixing a pigment or dye with the pre-spinning stock solution (stock solution coloring), or a printing method using an ink-jet or transfer process for dyeing of the three-dimensional knitted fabric.

The front layer knitted fabric and back layer knitted fabric of the three-dimensional knitted fabric composing the seat skin material of the embodiment do not need to have the same knitted texture, and they may have different knitted textures and stretch properties, but the standard deviation of the dynamic friction coefficient on the outer surface of the back layer knitted fabric is preferably smaller than the standard deviation of the dynamic friction coefficient on the outer surface of the front layer knitted fabric, since this will help facilitate attachment as a skin material.

The number of courses/wells of the front layer knitted fabric and back layer knitted fabric of the three-dimensional knitted fabric composing the seat skin material of the embodiment is preferably 18/18 to 43/28/2.54 cm and more preferably 25/20 to 40/24/2.54 cm. If the number of courses/wells is within this range it will be possible to increase the thermal conductance and heat dissipation value while maintaining air permeability, and also increasing the level of contact cooling. The predetermined number of courses/wells can be obtained by appropriately selecting the knitting machine gauge, the machine course and the heat setting conditions.

The thickness of the seat skin material of the embodiment may be set as desired depending on the purpose, but it is preferably 2 mm or greater and more preferably 3 mm or greater, and 15 mm or smaller and more preferably 10 mm or smaller. A thickness of 2 mm or greater will result in sufficient cushioning properties, and a thickness of 15 mm or smaller will facilitate knitting and finishing of the three-dimensional knitted fabric. The basis weight of the seat skin material of the embodiment is preferably 400 to 1000 g/m$^2$ and more preferably 500 to 800 g/m$^2$.

The method of finishing the three-dimensional knitted fabric that is to form the seat skin material of the embodiment may be finishing by steps of scouring and heat setting of the greige, for a three-dimensional knitted fabric using pre-dyed yarn or stock solution-dyed yarn. When the yarns forming the front layer knitted fabric, back layer knitted fabric and connecting thread are all uncolored yarn, the finishing may be by steps of presetting, scouring, dyeing and heat setting of the three-dimensional knitted fabric greige. Final essential heat setting after controlling the hardness of the three-dimensional knitted fabric is preferably carried out while adjusting the angle of the connecting thread by tentering using a pin tenter. The fabric may also be coated with a flame retardant for improved flame retardance. The finished three-dimensional knitted fabric may be edge-processed by means such as welding, sewing or resin treatment, or formed into a desired shape by hot molding, to obtain the final seat skin material, thus allowing application for such purposes as hammock seats. The back side of the seating surface may also be laminated with urethane as for a conventional seat skin material, but it is preferably used without lamination from the viewpoint of the recycling property.

EXAMPLES

The present invention will now be explained more concretely by Examples and Comparative Examples, with the understanding that the invention is in no way limited to the Examples.

The methods used in the Examples for measuring the physical properties were the following.

(1) Thermal Conductance (W/m$^2$·° C.)

This was measured using a THERMO LABO II Tester by Kato Tech Corp. Specifically, a sample to be used for measurement is humidified for 24 hours or longer in an environment of 20° C., 65% RH, and then cut to 15 cm×15 cm, and the side opposite the seating surface is contacted with a hot plate at 20° C. A 5 cm×5 cm hot plate heated to 30° C. is placed on the seating surface side of the sample, and the amount of heat transfer after 5 minutes is read off and recorded, per temperature difference of 1° C. and 1 m$^2$ fabric area (W/m$^2$·° C.).

(2) Air Permeability from Back Layer Knitted Fabric Through Front Layer Knitted Fabric of Three-Dimensional Knitted Fabric (Cc/Cm$^2$/Sec)

The air permeability from the back layer knitted fabric side through the front layer knitted fabric side of the three-dimensional knitted fabric is measured using an FX3300 LABOAIR IV air permeability tester by Takayama Reed Co., Ltd., according to the air permeability test method (Air Volume Method A) of JIS-L-1096, 1018.

(3) Heat Dissipation Value (W/m$^2$·° C.)

This is measured using a THERMO LABO II Tester by Kato Tech Corp. As the specific measuring method, a sample to be used for measurement is humidified for 24 hours or longer in an environment of 20° C., 65% RH, and then cut to 15 cm×15 cm, and the seating surface is contacted with a heater kept at a constant temperature of 30° C., reading off the heat supply necessary to keep the heater temperature at 30° C. with a wind speed of 0.3 m/sec, and recording the temperature difference per 1° C. and per 1 m$^2$ fabric area (W/m$^2$·° C.).

(4) Contact Cooling (W/m$^2$·° C.)

This is measured using a THERMO LABO II Tester by Kato Tech Corp. As the specific measuring method, a sample to be used for measurement is humidified for 24 hours or longer in an environment of 20° C., 65% RH, and then cut to 8 cm×8 cm, and then having the sample placed with the measuring surface facing upward, reading off the maximum heat transfer quantity at the instant that the hot plate heated to 30° C. is placed in the environment of 20° C., 65% RH, and recording the temperature difference per 1° C. and per 1 m$^2$ fabric area (W/m$^2$·° C.).

(5) Air Permeability from Connecting Layer Through Front Side Knitted Fabric of Three-Dimensional Knitted Fabric (Cc/Cm$^2$/Sec)

Using an FX3300 LABOAIR IV air permeability tester by Takayama Reed Co., Ltd., a 15 cm-square three-dimensional knitted fabric test piece is set at the opening of the air permeability tester with the front layer knitted fabric facing downward, a 3 mm-thick, 20 cm-square silicon rubber plate is layered over the outer surface of the back layer knitted fabric and the test head of the air permeability tester is pressed against the top and fixed with a clamp, measuring the air permeability as air enters from the connecting layer of the four sided cross-section of the three-dimensional knitted fabric and passes through the front side knitted fabric, under suction conditions according to the air permeability test method (Method A) of JIS L1096, 1018.

(6) Stitch Density M

The number of stitches N of the front layer knitted fabric per 2.54 cm-square (6.45 cm$^2$) of the three-dimensional knitted fabric is measured using a microscope. At least 10 cm of yarn is extracted from the front layer knitted fabric, and the length and weight of a 15 gf load on a single thread is measured, calculating the single thread size. When two or more fibers form a single stitch of the front layer knitted fabric, the total fineness D (decitex) of the multifilament yarn forming one stitch of the front layer knitted fabric is measured by totaling the sizes of each of the threads. The connecting thread is not included in this case. The size of fibers forming the stitches of a front layer knitted fabric before knitting of the three-dimensional knitted fabric can be measured according to JIS L 1013. The number of stitches N measured as described above and the total fineness D (decitex) are used to calculate the stitch density M by the following formula:

$$\text{Stitch density } M=N\times\sqrt{D}.$$

(7) Thermal Comfort and Sitting Comfort

An SUV type sheet with a test seat skin material attached was provided, and 10 wear monitors (male, body height: 170 cm±10 cm, ages: 22-32) were selected for an organoleptic test in which each monitor was asked to sit with the details hidden from view. The participants all wore the same type of long-sleeve T-shirt and polyester jersey trousers. Standing for 10 minutes in an environmental chamber at 28° C., 50% RH was followed by further standing for 30 minutes after transfer to an environmental chamber at 32° C., 50% RH.

The thermal comfort including cool feel and stuffiness, and the sitting comfort including cushioning property and feel on the skin, while sitting for 10 minutes in the same environment, was evaluated on the following 5-level scale, with the most frequent value being recorded as the evaluation results.

Evaluation Scale for Thermal Comfort

5: Comfortable
4: Moderately comfortable
3: Neither comfortable nor uncomfortable
2: Moderately uncomfortable
1: Uncomfortable <Evaluation Scale for Sitting Comfort>

5: Comfortable
4: Moderately comfortable
3: Neither comfortable nor uncomfortable
2: Moderately uncomfortable
1: Uncomfortable (8) Outer Appearance Change (Wear Resistance)

Males of body weight 60 to 65 Kg, wearing jeans, were asked to sit on a seat produced according to (7) above and conduct desk work for a total of 50 hours, after which the change in outer appearance was evaluated on the following scale.

<Evaluation Scale for Change in Outer Appearance>

VG: Absolutely no change in appearance
G: Some napping observed but little change in appearance
F: Considerable napping observed with some notable change in appearance
P: Severe napping with drastic change in appearance.

Example 1

A 22-gauge double Raschel knitting machine having 6 combs and 6 mm trick plate distance was used to supply false twisted yarn of 167 decitex, 48 filament polyethylene terephthalate fibers from two combs (L2, L3) for formation of the front layer knitted fabric, doubling the yarns in a 1-out, 1-in (L2) and 1-in, 1-out (L3) arrangement, to supply a monofilament of 110 decitex polyethylene terephthalate fiber from one comb (L4) for formation of the connection part in a 1-out, 1-in arrangement, and to supply false twisted yarn of 167 decitex, 48 filament polyethylene terephthalate fibers from two combs (L5, L6), for formation of the back layer knitted fabric, in an all-in array.

A greige for a three-dimensional knitted fabric was knitted with the knitted texture shown below, at a density of 35 course/2.54 cm. The obtained greige was stretched widthwise 1% and dry heat set at 175° C.×1 minute with a 0% overfeed rate to obtain a three-dimensional knitted fabric, for use as a seat skin material. The properties of the seat skin material are shown in Table 1 below.

(Knitted Texture)

L1: -
L2: 1011/2322/
L3:2322/1011/
L4: 3410/4367/
L5: 0001/1110/
L6: 2234/2210/35

Example 2

A seat skin material was obtained in the same manner as Example 1, except that the knitting density was 39 course/2.54 cm. The properties of the seat skin material are shown in Table 1 below.

Example 3

A 22-gauge double Raschel knitting machine having 6 combs and 6 mm trick plate distance was used to supply false twisted yarn of 167 decitex, 144 filament polyethylene terephthalate fibers from two combs (L2, L3) for formation of the front layer knitted fabric, doubling the yarns in a 1-out, 1-in (L2) and 1-in, 1-out (L3) arrangement, to supply a monofilament of 110 decitex polyethylene terephthalate fiber from one comb (L4) for formation of the connection part in a 1-out, 1-in arrangement, and to supply false twisted yarn of 167 decitex, 48 filament polyethylene terephthalate fibers from two combs (L5, L6), for formation of the back layer knitted fabric, in an all-in array.

A greige for a three-dimensional knitted fabric was knitted with the knitted texture shown below, at a density of 35 course/2.54 cm. The obtained greige was stretched widthwise 1% and dry heat set at 175° C.×1 minute with a 0% overfeed rate to obtain a three-dimensional knitted fabric, for use as a seat skin material. The properties of the seat skin material are shown in Table 1 below.

(Knitted Texture)

L1: -
L2: 2133/4533/
L3: 3422/1022/
L4: 4521/4367/
L5: 0001/1110/25
L6: 2234/2210/

Example 4

A 22-gauge double Raschel knitting machine having 6 combs and 6 mm trick plate distance was used to supply false twisted yarn of 167 decitex, 48 filament polyethylene terephthalate fibers from two combs (L2, L3) for formation of the front layer knitted fabric, doubling the yarns in a 1-out, 1-in (L2) and 1-in, 1-out (L3) arrangement, to supply a monofilament of 110 decitex polyethylene terephthalate fiber from one comb (L4) for formation of the connection part in a 1-out, 1-in arrangement, and to supply false twisted yarn of 167 decitex, 48 filament polyethylene terephthalate fibers from two combs (L5, L6), for formation of the back layer knitted fabric, in an all-in array.

A greige for a three-dimensional knitted fabric was knitted with the knitted texture shown below, at a density of 35 course/2.54 cm. The obtained greige was stretched widthwise 1% and dry heat set at 175° C.×1 minute with a 0% overfeed rate to obtain a three-dimensional knitted fabric, for use as a seat skin material. The properties of the seat skin material are shown in Table 1 below.

(Knitted Texture)

L1: No yarn supplied
L2:1011/1233/4544/4322/
L3:4544/4322/1011/1233/10
L4:3410/3245/2145/2310/
L5:0001/1110/
L6:2234/2210/

Example 5

A three-dimensional knitted fabric was obtained in the same manner as Example 4, except that the obtained greige was stretched widthwise 10% and dry heat set at 175° C.×1 minute with a 0% overfeed rate, and it was used as a seat skin material. The properties of the seat skin material are shown in Table 1 below.

Example 6

A three-dimensional knitted fabric was obtained in the same manner as Example 4, except that the obtained greige was stretched widthwise 15% and dry heat set at 175° C.×1 minute with a 0% overfeed rate, for use as a seat skin material with the back side of the knitted fabric as the seating surface. The properties of the seat skin material are shown in Table 1 below.

Example 7

A greige for a three-dimensional knitted fabric was knitted in the same manner as Example 1, except that a 22-gauge double Raschel knitting machine having 6 combs and 6 mm trick plate distance was used to supply false twisted yarn of 111 decitex, 24 filament polyethylene terephthalate fibers from two combs (L2, L3) for formation of the front layer knitted fabric, doubling the yarns in a 1-out, 1-in (L2) and 1-in, 1-out (L3) arrangement, and the obtained greige was stretched widthwise 15% and dry heat set at 175° C.×1 minute with a 0% overfeed rate, to obtain a three-dimensional knitted fabric, for use as a seat skin material. The properties of the seat skin material are shown in Table 1 below.

Comparative Example 1

A 14-gauge double Raschel knitting machine having 6 combs and 13 mm trick plate distance was used to supply No. 20 cupra rayon (spun yarn) in a 2-in, 2-out arrangement to the L1 guide and a 2-out, 2-in arrangement to the L2 guide, from two combs (L1, L2) for formation of the front layer knitted fabric. A 334 decitex, 96 filament polyethylene terephthalate false twisted yarn (doubled 167 decitex, 48 filament yarn) was supplied from two combs (L5, L6) for formation of the back layer knitted fabric, in a 2-in, 2-out arrangement to the L5 guide and a 2-out, 2-in arrangement to the L6 guide. Separately, 390 decitex polytrimethylene terephthalate monofilament yarn was supplied from a L4 comb for formation of the connecting thread, in a 2-in, 2-out arrangement to the L3 guide and a 2-out, 2-in arrangement to the L4 guide.

A greige for a three-dimensional knitted fabric was knitted with the knitted texture shown below, at a density of 15 course/2.54 cm. The obtained greige was stretched widthwise 30% and dry heat set at 170° C.×2 minutes to obtain a three-dimensional knitted fabric, for use as a seat skin material. The properties of the seat skin material are shown in Table 2 below.

(Knitted Texture)

L1: 4544/2322/1011/3233/
L2: 1011/3233/4544/2322/
L3: 4545/2323/1010/3232/
L4: 1010/3232/4545/2323/
L5: 3345/4423/2210/1132/20
L6: 2210/1132/3345/4423/

Comparative Example 2

A 14-gauge double Raschel knitting machine having 6 combs and 14.2 mm trick plate distance was used to supply false twisted yarn of 500 decitex, 144 filament polyethylene terephthalate fibers from two combs (L1, L2) for formation of the front layer knitted fabric, doubling the yarns in 1-in, 1-out (L1) and 1-out, 1-in (L2) arrangement, to supply a monofilament of 440 decitex polytrimethylene terephthalate fiber from two combs (L3, L4) for formation of the connection part in a 1-in, 1-out (L3) and 1-out, 1-in (L4) arrangement, to supply false twisted yarn of 500 decitex, 144 filament polyethylene terephthalate fibers from one comb (L5), for formation of the back layer knitted fabric, in an all-in array, and to supply a monofilament of 440 decitex polytrimethylene terephthalate fibers from another comb (L6), in an all-in array.

A greige for a three-dimensional knitted fabric was knitted with the knitted texture shown below, at a density of 12.8 course/2.54 cm. The obtained greige was stretched widthwise 4% and dry heat set at 160° C.×2 minutes and 30 seconds with a 0% overfeed rate to obtain a three-dimensional knitted fabric, for use as a seat skin material. The properties of the seat skin material are shown in Table 2 below.

(Knitted Texture)

L1: 1011/1233/4544/4322/5
L2: 4544/4322/1011/1233/
L3: 1023/1032/4532/4523/
L4: 4532/4523/1023/1032/
L5: 0001/1110/
L6: 2245/3310/10

Comparative Example 3

A 14-gauge, double Raschel knitting machine having 6 combs and 13 mm trick plate distance was used to supply false twisted yarn of 500 decitex, 144 filament polyethylene terephthalate fibers from two combs (L1, L2) for formation of the front layer knitted fabric (167 decitex, 48 filament polyethylene terephthalate false twisted yarn, triple interlaced yarn), in an all-in array. Separately, 390 decitex polyethylene terephthalate monofilament yarn was supplied from a comb (L3) for formation of the connecting thread, in an all-in array. There was also supplied false twisted yarn of 500 decitex, 144 filament polyethylene terephthalate false twisted yarn from two combs (L5, L6) for formation of the back layer knitted fabric (167 decitex, 48 filament high strength polyethylene terephthalate false twisted yarn, triple interlaced yarn), in an all-in array.

A greige for a three-dimensional knitted fabric was knitted with the knitted texture shown below, at a density of 13.5 course/2.54 cm. The obtained greige was stretched widthwise 3% and dry heat set at 170° C.×2 minutes to obtain a three-dimensional knitted fabric, for use as a seat skin material. The properties of the seat skin material are shown in Table 2 below.

(Knitted Texture)

L1: 2322/1011/
L2: 1011/1211/
L3: 3410/4367/30
L5: 1110/0001/
L6: 2210/2234/

Comparative Example 4

A 14-gauge, double Raschel knitting machine having 6 combs and 13 mm trick plate distance was used to supply false twisted yarn of 668 decitex, 192 filament polyethylene terephthalate fibers from two combs (L1, L2) for formation of the front layer knitted fabric (quadrupled 167 decitex, 48 filament polyethylene terephthalate yarn), in an all-in array. The same false twisted yarn was also supplied from two combs (L5, L6) for formation of the back layer knitted fabric, in an all-in array. Separately, 390 decitex polyethylene terephthalate monofilament yarn was supplied from a L3 comb for formation of the connecting thread, in an all-in array.

A greige for a three-dimensional knitted fabric was knitted with the knitted texture shown below, at a density of 12 course/2.54 cm. The obtained greige was stretched widthwise 5% and dry heat set at 170° C.×2 minutes to obtain a three-dimensional knitted fabric, for use as a seat skin material. The properties of the seat skin material are shown in Table 2 below.

(Knitted Texture)

L1: 1011/2322/
L2: 2322/1011/
L3: 4367/3410/
L5: 0001/1110/
L6: 2234/2210/

Comparative Example 5

A three-dimensional knitted fabric was obtained in the same manner as Example 1, except that the knitting density was 41 course/2.54 cm, for use as a seat skin material. The properties of the seat skin material are shown in Table 2 below. The three-dimensional knitted fabric had very poor knitting properties.

TABLE 1

| | Yarn usage | | | | | Contact cooling | | | | | | | | |
|---|---|---|---|---|---|---|---|---|---|---|---|---|---|---|
| | Front | Connecting thread | Back | Thickness mm | Thermal conductance W/m$^2$ · ° C. | Front W/m$^2$ · ° C. | Back W/m$^2$ · ° C. | Air permeability from back side layer to front side layer cc/cm$^2$/sec | Air permeability from connecting layer to front side layer cc/cm$^2$/sec | Heat radiation quantity W/m$^2$ · ° C. | Stitch density | Heat Comfort | Sitting Comfort | Change in outer appearance (wear resistance) |
| Example 1 | PET167/48 | PET110 | PET167/48 | 6.3 | 10.1 | 84 | 97 | 73 | 59 | 5.7 | 16229 | 5 | 5 | VG |
| Example 2 | PET167/48 | PET110 | PET167/48 | 6.4 | 10.0 | 94 | 100 | 53 | 43 | 5.8 | 20980 | 4 | 5 | VG |
| Example 3 | PET167/144 | PET110 | PET167/48 | 5.9 | 10.4 | 77 | 91 | 51 | 41 | 5.9 | 16229 | 4 | 4 | VG |
| Example 4 | PET167/48 | PET110 | PET167/48 | 6.3 | 10.0 | 89 | 102 | 78 | 65 | 6.0 | 16629 | 5 | 5 | VG |
| Example 5 | PET167/48 | PET110 | PET167/48 | 5.8 | 10.1 | 80 | 91 | 87 | 69 | 6.2 | 14474 | 5 | 4 | VG |
| Example 6 | PET167/48 | PET110 | PET167/48 | 5.5 | 10.7 | 84 | 72 | 92 | 72 | 6.4 | 12464 | 4 | 5 | VG |
| Example 7 | PET111/24 | PET110 | PET167/48 | 6.0 | 10.3 | 76 | 88 | 85 | 71 | 5.8 | 10162 | 5 | 5 | G |

TABLE 2

| | Yarn usage | | | | | Contact cooling | | | | | | | | |
|---|---|---|---|---|---|---|---|---|---|---|---|---|---|---|
| | Front | Connecting thread | Back | Thickness mm | Thermal conductance W/m$^2$ · ° C. | Front W/m$^2$ · ° C. | Back W/m$^2$ · ° C. | Air permeability from back side layer to front side layer cc/cm$^2$/sec | Air permeability from connecting layer to front side layer cc/cm$^2$/sec | Heat radiation quantity W/m$^2$ · ° C. | Stitch density | Heat Comfort | Sitting Comfort | Change in outer appearance (wear resistance) |
| Comp. Example 1 | Cupra20/- | PTT390 | PET167/48 | 10.0 | 7.0 | 60 | 50 | 400 | 388 | 6.6 | 3606 | 4 | 2 | P |
| Comp. Example 2 | PET500/144 | PTT440 | PET500/144 | 10.5 | 7.2 | 46 | 47 | 700 | 679 | 5.7 | 4448 | 3 | 24 | F |
| Comp. Example 3 | PET500/144 | PET390 | PET500/144 | 10.1 | 5.5 | 74 | 88 | 63 | 45 | 4.8 | 6066 | 3 | 42 | F |
| Comp. Example 4 | PET668/192 | PET390 | PET668/192 | 10.0 | 6.1 | 80 | 88 | 44 | 32 | 3.8 | 4342 | 1 | 4 | F |
| Comp. Example 5 | PET167/48 | PET110 | PET167/48 | 6.4 | 10.0 | 98 | 100 | 40 | 30 | 5.0 | 22516 | 2 | 5 | VG |

INDUSTRIAL APPLICABILITY

The seat skin material of the invention provides both sitting comfort and thermal comfort when used as the seating surface of a seat, while also providing a comfortable feel while sitting and exhibiting excellent wear resistance and undergoing little change in outer appearance even after prolonged use, and it can therefore be suitably used for furniture or office seats, or for vehicle seats in automobiles, railway vehicles, aircraft, child seats, baby strollers or wheelchairs, or for headrests or armrests.

The invention claimed is:

1. A seat skin material that includes a three-dimensional knitted fabric constructed of a front layer knitted fabric, a back layer knitted fabric, and connecting thread connecting the front layer knitted fabric and back layer knitted fabric, wherein the outer surface of the front layer knitted fabric is the seating surface, the thermal conductance value of the seat skin material is 8.0 W/m$^{2}$·° C. or greater, the air permeability from the back layer knitted fabric toward the front layer knitted fabric of the three-dimensional knitted fabric is 50 cc/cm$^{2}$/sec or greater, the heat dissipation value is 5.0 W/m$^{2}$·° C. or greater, the level of contact cooling on the seating surface is 75 W/m$^{2}$·° C. or greater, and the front layer knitted fabric includes multifilament yarn, and a stitch density M of the front layer knitted fabric is 11,000 to 21,000 stitches per 2.54 cm-square×√(decitex), wherein the stitch density M is represented by a formula (1):

$$M=N\times\sqrt{D} \quad (1)$$

wherein N is a number of stitches in the front layer knitted fabric per 2.54 cm-square, and D is a total fineness in decitex of the multifilament yarn forming one stitch of the front layer knitted fabric.

2. The seat skin material according to claim 1, wherein the thermal conductance value of the seat skin material is 40.0 W/m$^{2}$·° C. or lower.

3. The seat skin material according to claim 1, wherein the air permeability from the back layer knitted fabric toward the front layer knitted fabric of the three-dimensional knitted fabric is 400 cc/cm$^{2}$/sec or lower.

4. The seat skin material according to claim 1, wherein the heat dissipation value is 15.0 W/m$^{2}$·° C. or lower.

5. The seat skin material according to claim 1, wherein the level of contact cooling on the seating surface is 200 W/m$^{2}$·° C. or lower.

6. The seat skin material according to claim 1, wherein the level of contact cooling on the side opposite from the seating surface is 75 W/m$^{2}$·° C. to 200 W/m$^{2}$·° C.

7. The skin material according to claim 1, wherein the air permeability from the connecting layer side between the front layer knitted fabric and back layer knitted fabric toward the front layer knitted fabric of the three-dimensional knitted fabric is 35 cc/cm$^{2}$/sec or greater.

8. The skin material according to claim 7, wherein the air permeability from the connecting layer side between the front layer knitted fabric and back layer knitted fabric toward the front layer knitted fabric of the three-dimensional knitted fabric is 40 cc/cm$^{2}$/sec or greater.

9. The skin material according to claim 8, wherein the air permeability from the connecting layer side between the front layer knitted fabric and back layer knitted fabric toward the front layer knitted fabric of the three-dimensional knitted fabric is 50 cc/cm$^{2}$/sec or greater.

10. The skin material according to claim 1, wherein the air permeability from the connecting layer side between the front layer knitted fabric and back layer knitted fabric toward the front layer knitted fabric of the three-dimensional knitted fabric is 400 cc/cm$^{2}$/sec or lower.

11. The seat skin material according to claim 1, wherein the thickness is 3 to 15 mm.

12. The seat skin material according to claim 1, wherein the thermal conductance value of the seat skin material is 40.0 W/m$^{2}$·° C. or lower, the air permeability from the back layer knitted fabric toward the front layer knitted fabric of the three-dimensional knitted fabric is 400 cc/cm$^{2}$/sec or lower, the heat dissipation value is 15.0 W/m$^{2}$·° C. or lower, the contact cooling on the seating surface is 200 W/m$^{2}$·° C. or lower, and the air permeability from the connecting layer side between the front layer knitted fabric and back layer knitted fabric toward the front layer knitted fabric of the three-dimensional knitted fabric is 50 cc/cm$^{2}$/sec to 400 cc/cm$^{2}$/sec.

13. A seat including a seat skin material according to claim 1.

* * * * *